United States Patent [19]
Nishio

[11] Patent Number: 6,024,345
[45] Date of Patent: Feb. 15, 2000

[54] RESIN-MADE SPRING AND A BELLOWS TYPE CONSTANT VOLUME PUMP USING THE SAME

[75] Inventor: Kiyoshi Nishio, Sanda, Japan

[73] Assignee: Nippon Pillar Packing Co., Ltd., Osaka, Japan

[21] Appl. No.: 08/927,962

[22] Filed: Sep. 11, 1997

[30] Foreign Application Priority Data

Sep. 25, 1996 [JP] Japan .................................... 8-253409

[51] Int. Cl.⁷ .............................. F16F 1/36; F04B 43/02; F04B 39/10
[52] U.S. Cl. .......................... 267/165; 267/148; 417/472; 417/559
[58] Field of Search .................... 267/165, 148, 267/149; 417/472, 559

[56] References Cited

U.S. PATENT DOCUMENTS

| | | | |
|---|---|---|---|
| 5,013,013 | 5/1991 | Spedding | 267/165 |
| 5,438,472 | 8/1995 | Oh | 360/132 |
| 5,772,413 | 6/1998 | Oshidari | 417/472 |
| 5,803,441 | 9/1998 | Yamamoto | 267/165 |

*Primary Examiner*—Charles G. Freay
*Assistant Examiner*—Ehud Gartenberg
*Attorney, Agent, or Firm*—Jones, Tullar & Cooper, P.C.

[57] ABSTRACT

The present invention relates to a resin-made spring which, although the spring is made of a resin only, has a strength similar to that of a metal-made spring, and in which the strength is hardly reduced with time and can be maintained to a desired degree for a long term, and also to a bellows type constant volume pump which uses such a resin-made spring. The resin-made spring of the present invention has a configuration in which a strip-like PTFE-made sheet is bent in a zigzag manner in a longitudinal direction of the sheet to thereby provide a predetermined swelling curvature R, side faces of bent portions of the predetermined curvature are in close proximity to or in contact with each other, and the bent portions of the predetermined curvature are elastically expandable and contractible by means of heat holding and cooling. Such a PTFE-made spring is used as a spring for a check valve on the side of a tip end portion of a discharge hole of a bellows type constant volume pump.

14 Claims, 10 Drawing Sheets

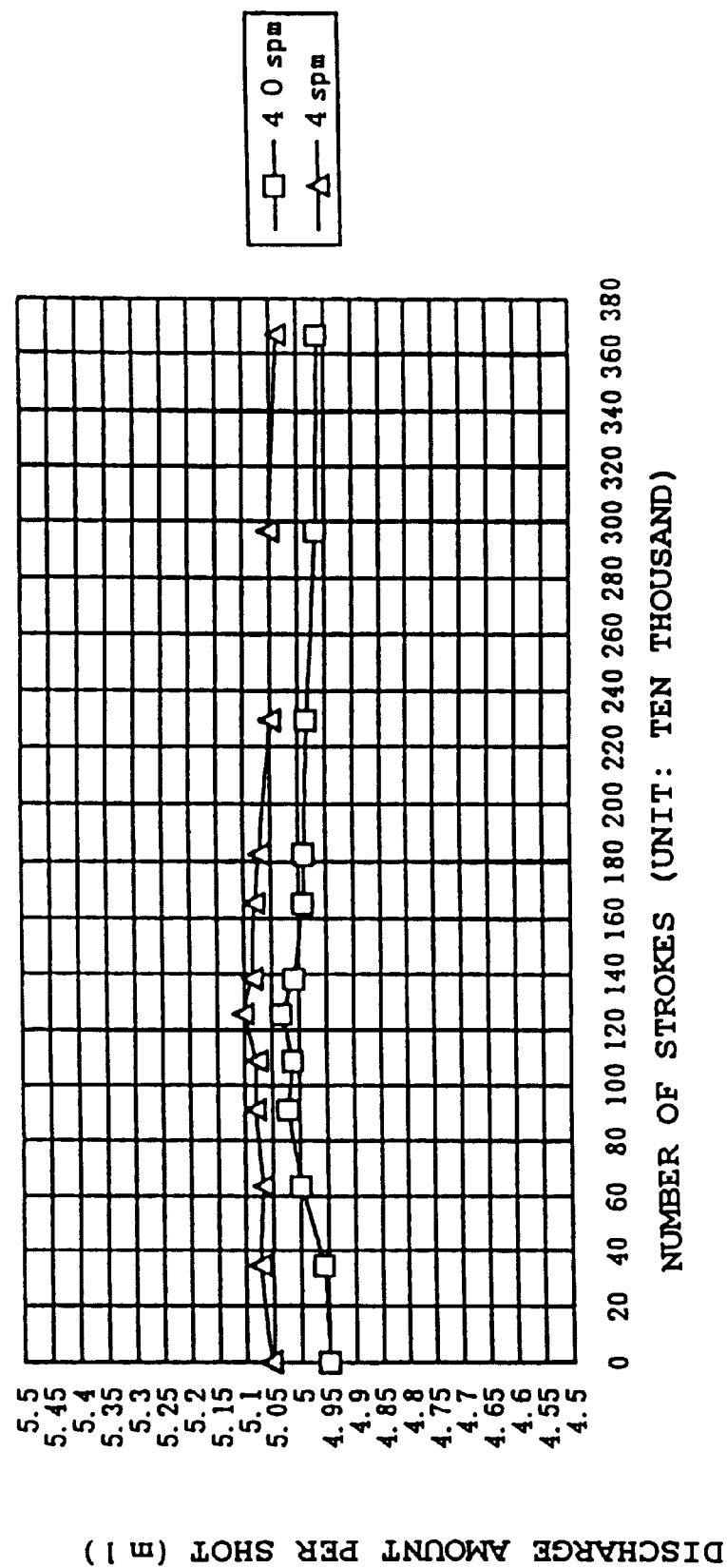

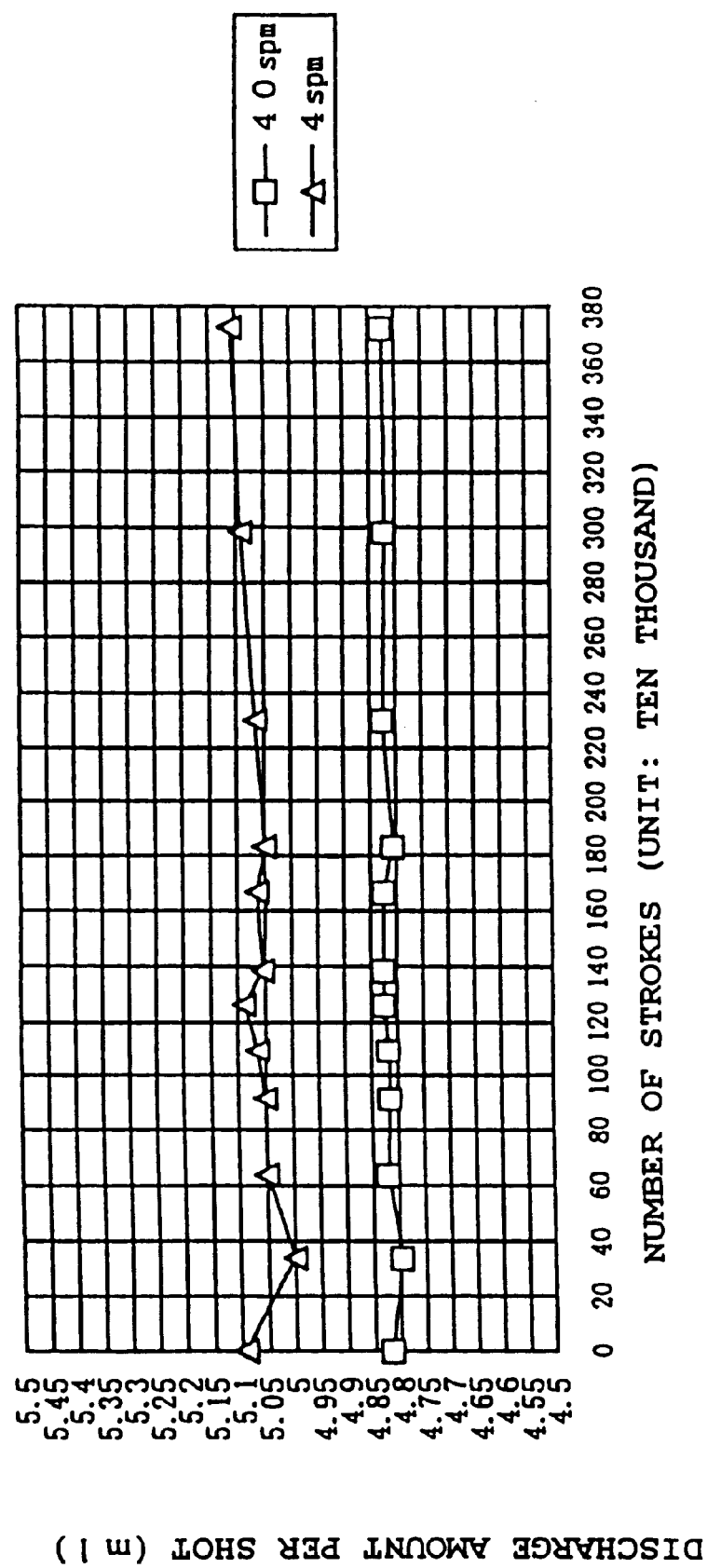

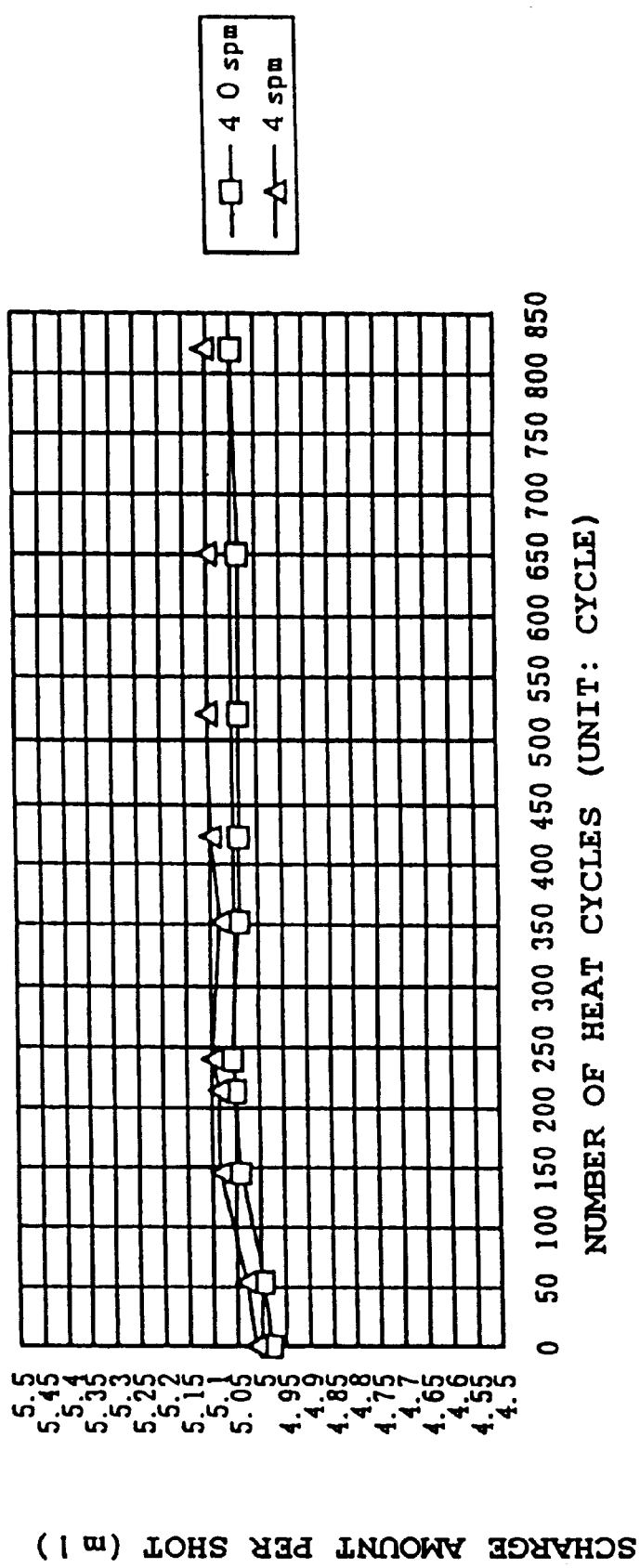

RESIN-MADE SPRING AND A BELLOWS TYPE CONSTANT VOLUME PUMP USING THE SAME

BACKGROUND OF THE INVENTION

1. Field of the Invention

The present invention relates to a resin-made spring which is used as a spring for a check valve disposed in a fluid apparatus such as various kinds of pumps and valves.

Furthermore, the present invention relates also to a bellows type constant volume pump into which a resin-made spring is incorporated, and particularly to a bellows type constant volume pump for transporting a fluid such as chemicals or pure water which is desired to be subjected to constant volume transportation that is free from retention.

2. Description of the Prior Art

A spring which is to be used in a fluid path is required to have the property that it is not corroded or rusted by contact with the fluid, or to have excellent chemical resistance and a rust proof property. As a spring which satisfies such requirements, conventionally, known are a resin-made spring which is produced by forming a fluororesin such as PTFE (Polytetrafluoroethylene) or PFA (Perfluoroalkoxyfluoro Plastics) into a coil-like shape, and a resin-coated spring which is produced by coating the whole outer surface of a metal-made spring with a fluororesin such as PTFE or PFA.

Particularly, a bellows type constant volume pump which handles a fluid such as chemicals or pure water is strongly required to be excellent in chemical resistance and to have a rust proof property. In a prior art bellows type constant volume pump of this kind, therefore, a resin-made spring which is produced by forming a fluororesin such as PTFE or PFA into a coil-like shape is used as a spring. The spring is incorporated into a check valve that is disposed at a basal end portion of a suction hole of the pump body, or a tip end portion of a discharge hole so as to allow flow only in the suction direction or the discharge direction and inhibit flow in the opposite direction. The spring elastically urges the valve element of the check valve in the closing direction.

However, resin-made spring of the prior art exerts a weak repulsion force (a repulsion strength: a spring force). Even if the repulsion force is of a degree similar to that of a metal-made spring at an initial stage, "setting" due to repetitive use remarkably appears. As a result, the repulsion force is inevitably reduced with time by the creep of the resin, particularly, thermal creep.

According to the configuration of a resin-coated spring of the prior art, it is very difficult to produce a spring of small size because of technical problems, resulting in high production cost. Furthermore, the coating resin may be peeled off, thereby producing a fear that the expected chemical resistance and rust proof property cannot be maintained.

When the above-mentioned coil-like resin-made spring is used as a spring which is to be incorporated into a check valve for a bellows type constant volume pump, there arises the following problem. In the case where the pump is used by placing the discharge port at a level lower than the suction tank, when the discharging pressure is lower than the head pressure of the tank, a siphon phenomenon occurs during a discharge process because of a small spring load value which urges the valve element of the check valve on the side of the tip end portion of the discharge hole in the closing direction. This causes the valve element of the check valve on the side of the basal end portion of the suction hole to unexpectedly open at a pressure which is lower than the head pressure of the tank, thereby suppressing buildup of the internal pressure gradient of the pump. As a result, a larger amount of fluid flows thereby increasing the discharge amount, and the desired constant volume property cannot be ensured. In a coil-like resin-made spring of the prior art, moreover, the repulsion force is reduced with time by creep, particularly, thermal creep. Also for long-term use at either ordinary temperature or a high temperature, therefore, the constant volume property cannot be stably maintained.

SUMMARY OF THE INVENTION

It is an object of the present invention to provide a resin-made spring which, although the spring is made of resin only, has a strength similar to that of a metal-made spring.

It is another object of the present invention to provide a resin-made spring in which the repulsion force is hardly reduced with time and can be maintained to a desired degree for a long term.

It is a further object of the present invention to provide a bellows type constant volume pump which can effectively use the excellent properties of such a resin-made spring.

It is a still further object of the present invention to provide a bellows type constant volume pump in which, also under conditions that the discharge port is placed at a level lower than the suction tank and discharge is repeatedly conducted in a range from ordinary temperature to a high temperature, a siphon phenomenon is prevented from occurring, so that a predetermined constant volume property is stably maintained.

In order to attain the objects noted, the resin-made spring of the present invention has a configuration in which a strip-like resin-made sheet is bent in a zigzag manner in a longitudinal direction of the sheet to thereby provide a predetermined swelling curvature. Side faces of adjacent bent portions of the predetermined curvature are in close proximity to or in contact with each other. Preferably, the bent portions of the predetermined curvature are elastically expandable and contractible by means of heat holding and cooling.

In the resin-made spring of the present invention, the state where the strip-like resin-made sheet is bent in a zigzag manner to thereby provide a predetermined swelling curvature and side faces of adjacent bent portions of the predetermined curvature which are in close proximity to or in contact with each other, is set to be a free length. When a compression force is further applied to the spring, therefore, the swelling curvature of each bent portion is increased. Forces which are exerted by the restoring action of the increased curvatures to the original swelling curvatures combine with each other to exhibit a large repulsion force. As compared with a coil-like resin spring of the prior art, therefore, setting due to repetitive uses, and strength reduction with time due to creep of the resin are very low in degree. Furthermore, the bent portions of the predetermined curvature are configured so as to be elastically expandable and contractible by means of heat holding and cooling. Consequently, the spring has a restoring property so high that the spring can be used even when heat is applied to it, and the repulsion force is not substantially reduced even after heat cycles, so that the initial repulsion force is maintained for a long time. Moreover, such a repulsion force can be attained by using resin only. The spring can be produced in an easier manner than a resin-coated spring of the prior art, and hence the cost can be largely reduced.

As a resin constituting the strip-like sheet, preferably, employed is a fluororesin, particularly, either of PTFE and PFA which have an excellent thermal creep property. In order to attain a predetermined repulsion force, the strip-like sheet is preferably designed so that the thickness is 0.05 to 1.0 mm and the radius of curvature of each bent portion is 0.05 mm or more. The temperature of the heat held in a compressed state is 100 to 300° C., preferably, in the vicinity of 200° C. Preferably, cooling is conducted by immersing the spring into water so as to rapidly cool it to room temperature.

The bellows type constant volume pump of the present invention comprises: a pump body in which a suction hole for a fluid to be transported, and a discharge hole for the fluid to be transported are formed, the discharge hole opening in an end face of a tip end portion of a circular projection in which a fluid path communicating with the suction hole is formed; a bellows which is disposed on an outer periphery of the circular projection, one end of the bellows being fixed to the pump body, and another end closed portion being movable between a compression end position where the other end closed portion abuts against the end face of the tip end portion of the circular projection, and an expansion end position where the other end closed portion is separated from the end face of the tip end portion of the circular projection; a reciprocating driving device which is connected to the bellows and which causes the bellows to expand and contract; a check valve which is disposed at a basal end portion of the suction hole and which allows only a flow of the fluid to be discharged, in a suction direction; and another check valve which is disposed at a tip end portion of the discharge hole and which allows only a flow of the fluid to be discharged, in a discharge direction. The pump using a resin-made spring as a spring for elastically urging, in a closing direction, a valve element, from among the two check valves, and at least the check valve on the side of the discharge hole. The resin-made spring has a configuration in which a strip-like resin-made sheet is bent in a zigzag manner in a longitudinal direction of the sheet to thereby provide a predetermined swelling curvature, and side faces of adjacent bent portions of the predetermined curvature being in close proximity to or in contact with each other.

In the bellows type constant volume pump of the present invention, the bent portions of the predetermined curvature of the strip-like sheet are preferably configured so as to be elastically expandable and contractible by means of heat holding and cooling. Preferably, the resin constituting the strip-like sheet is PTFE. The strip-like sheet preferably has a thickness of 0.05 to 1.0 mm and the radius of curvature of each bent portion is 0.05 mm or more.

According to the bellows type constant volume pump of the present invention, it is possible to increase the spring load value which urges the valve element of the check valve on the side of the tip end portion of the discharge hole in the closing direction. Even in the case where the pump is used with the discharge port placed at a level lower than the suction tank, the check valve on the side of the tip end portion of the discharge hole opens only after a discharging pressure is generated in the bellows which is higher than the head pressure of the tank by several times. At this time, the close state of the check valve on the side of the basal end portion of the suction hole is surely held by the internal pressure of the bellows, so as to oppose the head pressure of the tank. Therefore, a siphon phenomenon which may be caused by an unexpected opening operation of the check valve on the side of the basal end portion of the suction hole at a pressure lower than the head pressure of the tank is prevented from occurring. As a result, the predetermined constant volume property can be ensured. Furthermore, the strength of the resin-made spring is not lowered with time by creep or thermal creep. Even when the pump is repeatedly operated in a range from ordinary temperature to a high temperature, therefore, the predetermined constant volume property is stably maintained.

Other objects and effects of the present invention will be more apparent from the following description of the embodiments.

BRIEF DESCRIPTION OF THE DRAWINGS

FIG. 10 is a graph showing the results of a test at ordinary temperature in a long-term test for the constant volume property of a bellows type constant volume pump using a PTFE-made spring of the present invention;

FIG. 11 is a graph showing the results of a test at 80° C. in the long-term test; and FIG. 12 is a graph showing the results of a test for heat cycles in the long-term test.

DETAILED DESCRIPTION OF THE PREFERRED EMBODIMENT

Hereinafter, embodiments of the present invention will be described with reference to the accompanying drawings.

Figure 1A:
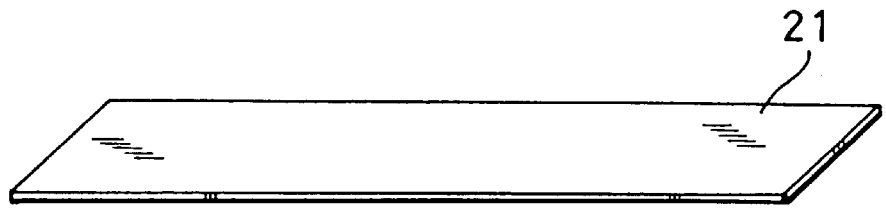
FIGS. 1A to 1C are schematic perspective views showing a method of producing the resin-made spring of the present invention.
Figure 1B:
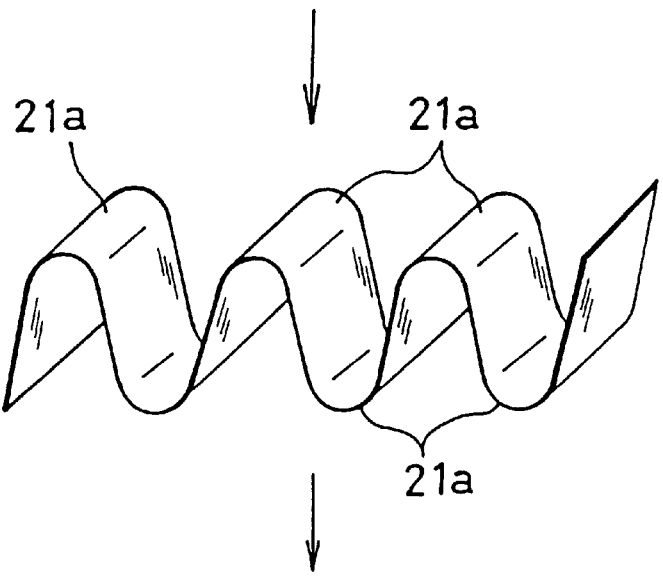
Figure 1C:
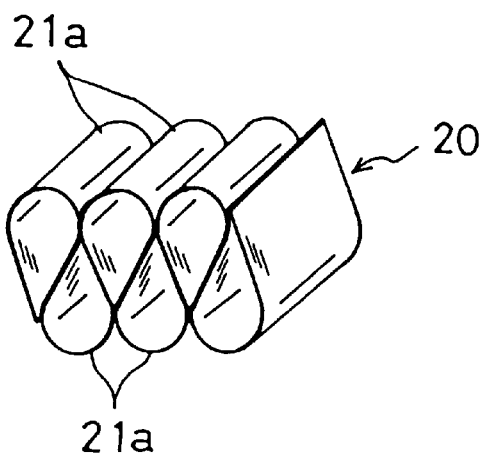
Figure 2:
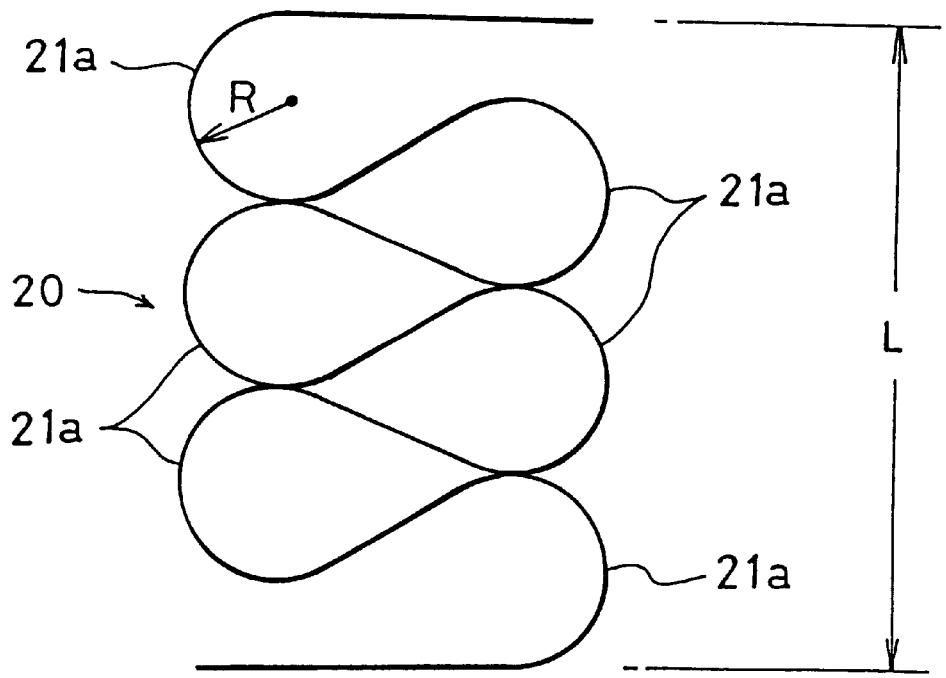
FIG. 2 is an enlarged side view of the produced resin-made spring.

FIGS. 1A to 1C are schematic perspective views showing a method of producing the resin-made spring of the present invention, and FIG. 2 is an enlarged side view of the produced resin-made spring.

The resin-made spring 20 shown in FIG. 2 is configured so that a strip-like PTFE-made sheet 21 shown in FIG. 1A and having a thickness of 0.05 to 1.0 mm is bent in a zigzag manner in the longitudinal direction of the sheet and provides a predetermined swelling radius of curvature R of 0.05 mm or more as shown in FIG. 1B. Thereafter, the spring is heated to 100 to 300° C., preferably, to the vicinity of 200° C. under the state where, as shown in FIG. 1C, the spring is compressed so that side faces of bent portions 21a of the predetermined curvature which are adjacent to each other in the longitudinal direction are in close proximity to or in contact with each other, and the heating state is held for 5 minutes or more. The spring is then immersed into water to be rapidly cooled to ordinary temperature. As a result, as shown in FIG. 2, the bent portions 21a are configured so as to be elastically expandable and contractible, and the compressed state set as the free length L.

Figure 3:
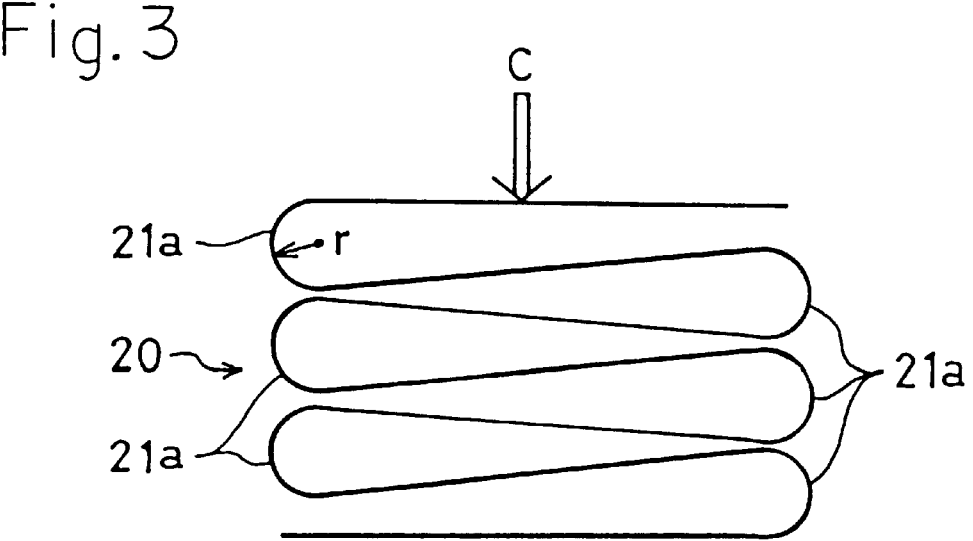
FIG. 3 is an enlarged side view showing a state change in the case where a compression force is applied to the resin-made spring.

In the thus configured PTFE-made spring 20, when a compression force C is further applied to the spring as shown in FIG. 3, the radius of curvature r of each of the swelling bent portions 21a is smaller than the radius of curvature R in the free length L (the curvature is larger). Forces which are exerted in restoring the reduced radius of curvature r to the original swelling radius of curvature R are combined with each other to exhibit a large repulsion force. As compared with a coil-like resin spring of the prior art, setting due to repetitive uses, and strength reduction with time due to resin creep are very low in degree. Furthermore, the spring has a restoring property so high that the spring can be used even when heat is applied to it, and the repulsion force and the strength are not substantially reduced even after heat cycles, so that the initial strength is maintained.

The PTFE-made spring 20 of the present invention and a coil-like resin-made spring of the prior art were tested for repulsion force, and the results shown in Table 1 below were obtained. As apparent also from Table 1, in the coil-like resin-made spring of the prior art, the repulsion force after heat cycles of ordinary temperature to 100° C. is rapidly reduced as the heat cycles proceed, and the repulsion force after heating to 200° C. cannot be substantially expected. By contrast, in the PTFE-made spring 20 of the present invention, the repulsion force after heat cycles of ordinary temperature to 100° C. is larger than that before the heat cycles, and the rate of reduction due to the progress of the heat cycles is very small, with the result that the creep property and the thermal creep property are excellent. Moreover, the repulsion force after heating to 200° C. is not substantially reduced. Table 1 shows residual values as a percentage when setting the repulsion force before the test to be 100.

TABLE 1

| | Repulsion force after heating | After heat cycles (ord. temp - 100° C.) | | | |
|---|---|---|---|---|---|
| | to 200° C. | 1 cycle | 5 cycles | 10 cycles | 20 cycles |
| Prior art | 5> | 32 | 18 | 12 | 9 |
| Invention | 86 | 120 | 110 | 113 | 112 |

Both the resin-made springs were tested on bending fatigue in accordance with the MIT test (ASTM, D2176), and the results shown in Table 2 below were obtained. As apparent also from Table 2, the PTFE-made spring 20 of the present invention is not broken because of the properties of the materials, and hence has properties that, even when the spring is repeatedly operated, the spring is not broken during at least tens of millions of operations.

TABLE 2

| | Number of repeated bends before break |
|---|---|
| Invention | Not broken ($1 \times 10^8 <$) |
| Prior art | $9.3 \times 10^5$ |

Figure 4:
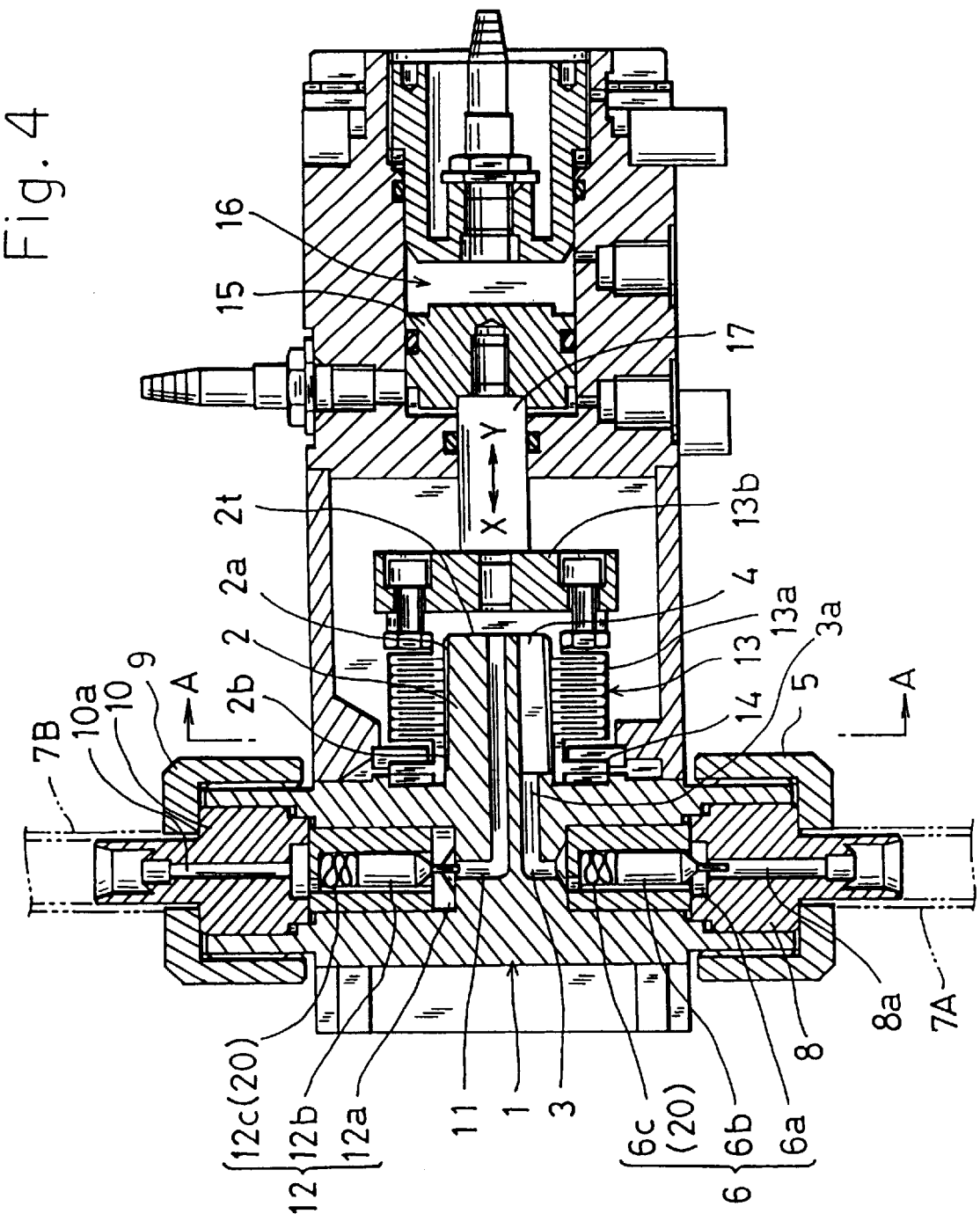
FIG. 4 is a longitudinal side section view of the bellows type constant volume pump of the present invention.

FIG. 4 is a longitudinal section view of the bellows type constant volume pump of the present invention. In FIG. 4, 1 designates the disk-like pump body. A projection 2 having a circular section shape is continuously integrated with one end of the axial direction of the pump body. In the outer peripheral face of the circular projection 2, an outer peripheral face 2a on the side of a tip end portion corresponding to a movable portion of a bellows which will be described later is formed into a tapered face in which the diameter is reduced when moving toward the tip end in the axial direction, and an outer peripheral face 2b on the side of a basal end portion corresponding to an unmovable portion of the bellows is formed into a columnar face which is straight in the axial direction.

Figure 5:
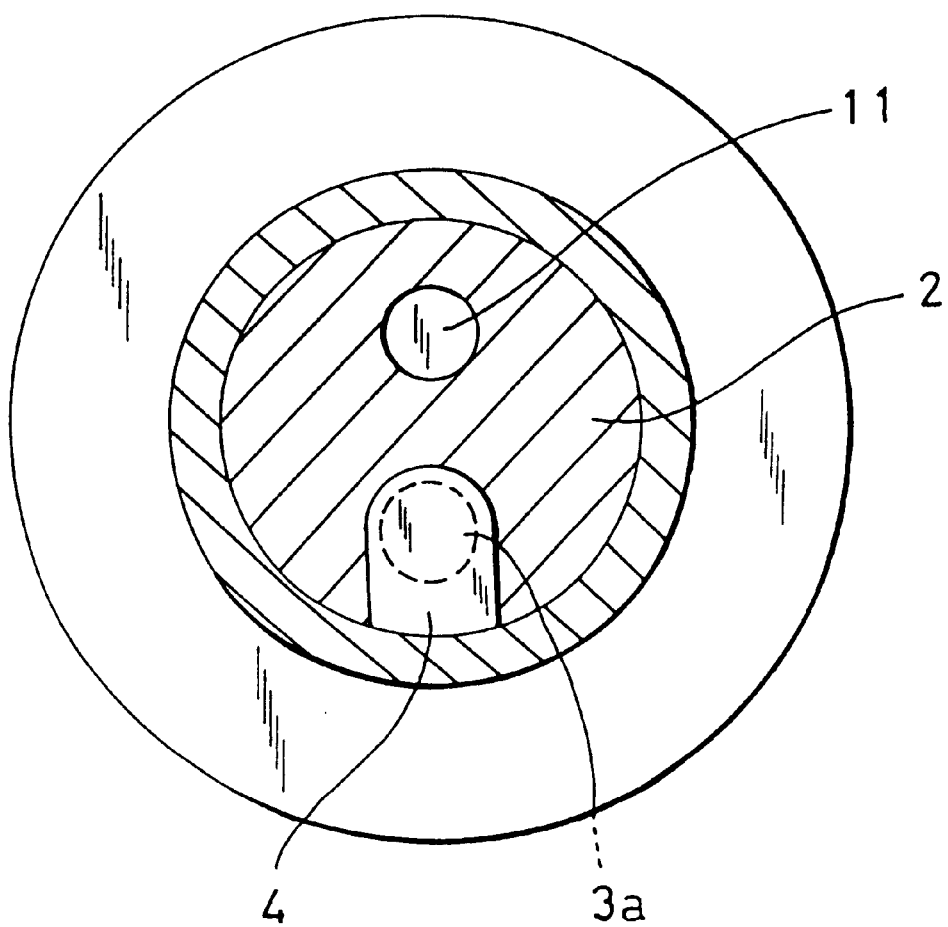
FIG. 5 is a longitudinal front section view taken along the line A—A of FIG. 4.

The reference numeral 3 designates a suction hole for a fluid to be transported. The suction hole 3 is formed at a position which deviates from the center axis of the pump body 1. The tip end portion of the suction hole 3 opens in the basal end portion of the circular projection 2. As shown in FIG. 5, a groove-like fluid path 4 having a substantially U-like section shape and communicating with the suction hole 3 is formed in the side face of the circular projection 2 extending from the opening 3a to the end face 2t of the tip end portion of the circular projection 2. A check valve 6 which allows only a flow of the fluid to be transported in the suction direction and which blocks the flow in the opposite direction is held in the basal end portion of the suction hole 3 by a cap nut 5 screwed to the pump body 1, and a valve guard 8 having an internal flow path 8a to which a pipe 7A for the fluid to be transported can be communicatively connected.

The reference numeral 11 designates a discharge hole for the fluid to be transported. The hole is formed at a position which deviates from the center axis of the pump body 1 to the side opposite to the suction hole 3 with respect to the axis. The basal end portion of the discharge hole 11 opens in the end face 2t of the tip end portion of the circular projection 2. A check valve 12 which allows only a flow of the fluid to be transported, in the discharge direction and which blocks the flow in the opposite direction is held in the tip end portion of the discharge hole 11 by a cap nut 9 screwed to the pump body 1, and a valve guard 10 having an internal flow path 10a to which a pipe 7B for the fluid to be transported can be communicatively connected.

The reference numeral 13 designates the bellows which has folds 13a and which is disposed on the outer periphery of the circular projection 2. One end portion of the bellows abuts against one side face of the pump body 1 and is fixed thereto via a fixing plate 14. A closing portion 13b which abuts against and separates from the end face 2t of the tip end portion of the circular projection 2 as the bellows 13 expands and contracts. The reference numeral 15 designates a reciprocal moving member such as a piston which is reciprocally moved in the axial direction by a reciprocal driving device 16 such as a fluid cylinder. A center part of the closing portion 13b of the bellows 13 is connected to a tip end portion of a shaft 17 fixed to the reciprocal moving member 15, so that the bellows 13 is caused to expand and contract by the reciprocal movement of the reciprocal moving member 15.

In the bellows type constant volume pump of such a configuration, the check valve 6 which is held in the basal end portion of the suction hole 3, and the check valve 12 which is held in the tip end portion of the discharge hole 11 comprise valve seats 6a and 12a, slidable valve elements 6b and 12b, and springs 6c and 12c which elastically urge the valve elements 6b and 12b in the closing direction, respectively. The PTFE-made spring 20 described in FIGS. 1A to 3 is used as the springs 6c and 12c.

In the thus configured bellows type constant volume pump, the reciprocal moving member 15 is reciprocated by the reciprocal driving device 16 in the directions of the arrows X and Y of FIG. 4, thereby causing the bellows 13 to expand and contract. During the expansion period of the bellows, the closing portion 13b is separated from the end face 2t of the tip end portion of the circular projection 2, and the tip end portion of the U-shaped groove-like fluid path 4 opens, so that the pressure of the internal space of the bellows 13 becomes negative. Therefore, a predetermined amount of the fluid to be transported, in the one fluid pipe 7A is sucked into the space formed between the closing portion 13b and the end face 2t of the tip end portion of the circular projection 2, via the internal fluid path 8a of the valve guard 8, the check valve 6, the suction hole 3, and the groove-like fluid path 4.

During the contraction period of the bellows 13, the closing portion 13b is moved so as to gradually approach the end face 2t of the tip end portion of the circular projection 2, and finally abuts against the end face 2t. During this period, the fluid to be transported which has been sucked into the space is pressurized by the bellows 13. Therefore, the fluid to be transported is pressed into the discharge hole 11 to be discharged from the tip end portion of the hole into the other fluid pipe 7B via the check valve 12 and the internal fluid path 10a of the valve guard 10. In this way, in accordance with the expanding and contracting operations of the bellows 13, the fluid to be transported is intermittently transported in the unit of a predetermined amount from the one fluid pipe 7A to the other fluid pipe 7B.

In the bellows type constant volume pump, as described above, the PTFE-made spring 20 which produces a strong repulsion force and in which strength reduction with time due to creep or thermal creep is very low in degree is used as the spring 12c which urges the valve element 12b in the closing direction the of the check valve 12 on the side of the tip end portion of the discharge hole 11. Consequently, the spring load value which urges the valve element 12b of the check valve 12 in the closing direction is increased. Even in the case where the pump is used for placing the opening of the discharge hole 11 of the pump at a level lower than the suction tank, therefore, the valve element 12b of the check valve 12 on the side of the tip end portion of the discharge hole 11 opens only after a discharging pressure which is higher than the head pressure of the tank by several times is generated in the bellows 13. At this time, the close state of the valve element 6b of the check valve 6 on the side of the basal end portion of the suction hole 3 is surely held by the internal pressure of the bellows 13, so as to oppose the head pressure of the tank. Therefore, a siphon phenomenon which may be caused by an unexpected opening operation of the valve element 6b of the check valve 6 on the side of the basal end portion of the suction hole 3 at a pressure lower than the head pressure of the tank is prevented from occurring. As a result, the predetermined constant volume property can be ensured. Furthermore, the strength of the PTFE-made spring 12c is not lowered with time by creep or thermal creep. Even when the pump is repeatedly operated in a range from an ordinary temperature to a high temperature of 100° C., therefore, the constant volume property can be stably maintained.

The contents and results of a test of reproducibility were conducted and will be described. The test was conducted on the constant volume property of a bellows type constant volume pump of 5 ml/shot in which a coil-like resin-made spring of the prior art is used as the spring 12c that elastically urges in the closing direction the valve element 12b of the check valve 12 on the side of the tip end portion of the discharge hole 11.

Figure 6:
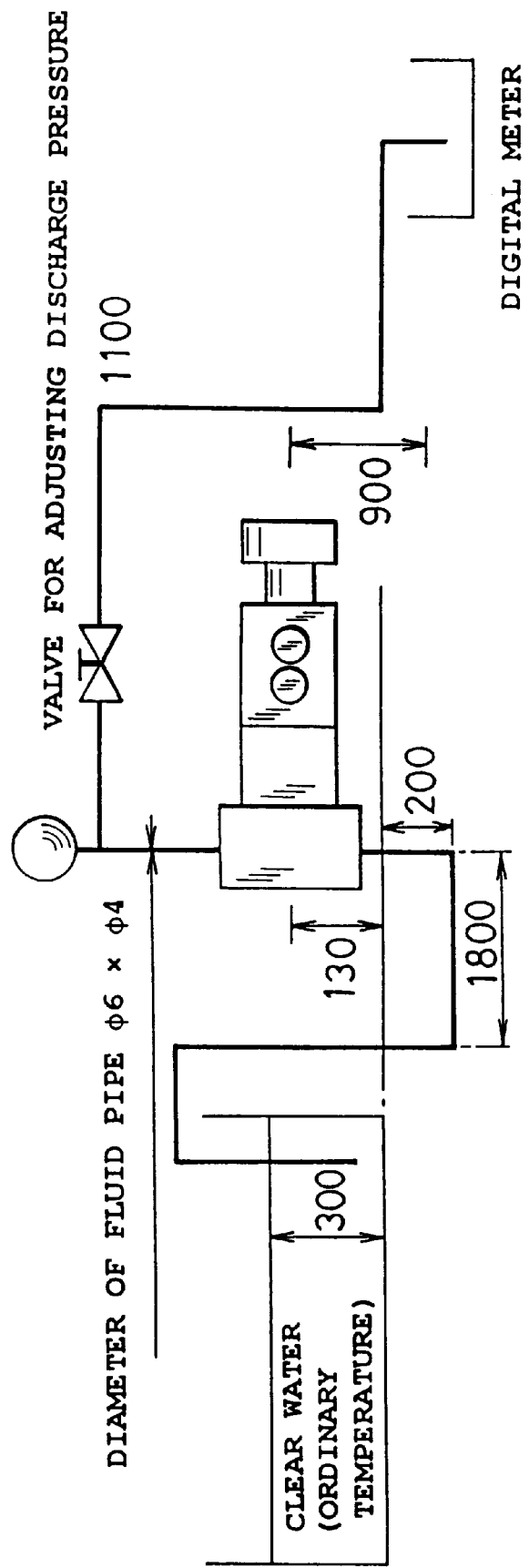
FIG. 6 is a diagram illustrating a piping system for a test of reproducibility for the constant volume property of a bellows type constant volume pump.
Figure 7:
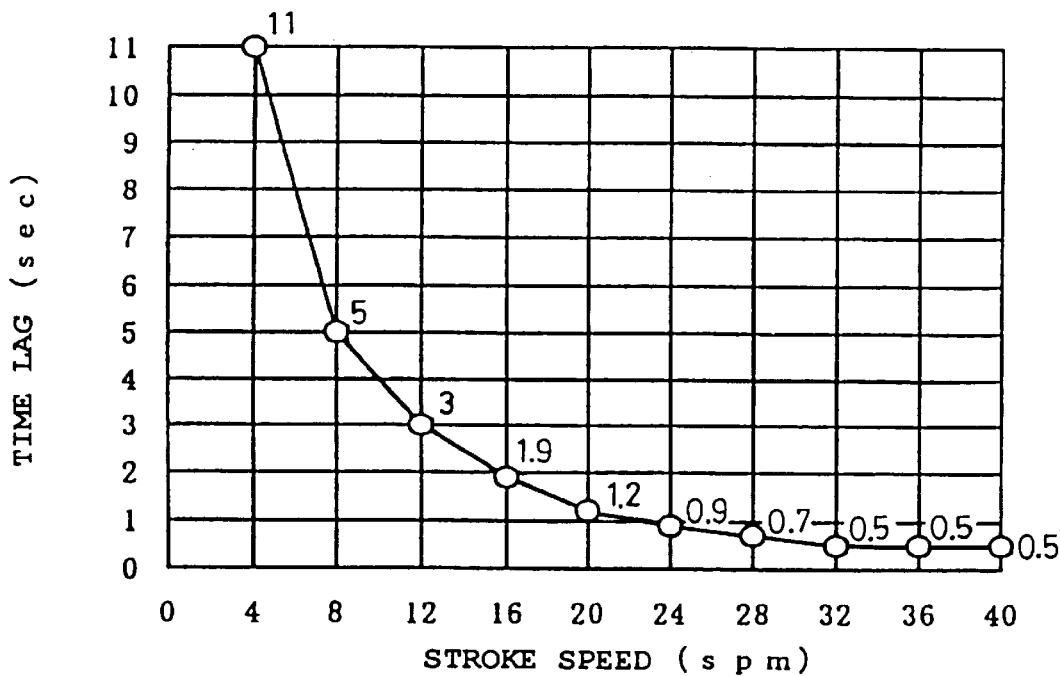
FIG. 7 is a graph showing the correlation between the stroke speed and the time lag of a solenoid operated valve on the discharge side and used in the test.

Method of the test of reproducibility and test conditions:

FIG. 6 shows a piping system for the reproducibility test, and Table 3 shows the operating conditions of the pump for the test.

TABLE 3

| | |
|---|---|
| Supply pressure of pump | 0.25 MPa (2.5 kgf/cm$^2$) |
| Stroke speed of pump | 4 to 40 spm (variable by using a speed controller) |
| Liquid used in pump and temp. | Clear water (ordinary temperature) |
| Air piping | φ4 × φ3 PFA tube, 2m |
| Time lag of solenoid operated valve | Suction side [Fixed to 0.5 sec.] Discharge side [time lag correlation table of PF-3033 which was reported] |
| Measurement of discharge amount | (1) Time lag of a solenoid operated valve on the discharge side is set as time lag of the measurement stroke speed. (2) Stroke speed is adjusted by a speed controller. (3) Measurement is done for 1 min. after start of pump operation, and a discharge amount per shot of the pump is calculated by using a digital meter. An average discharge amount is obtained from ten measurements. (4) Measurement is done for each stroke speed while repeating steps (1) to (3). |

Figure 8:
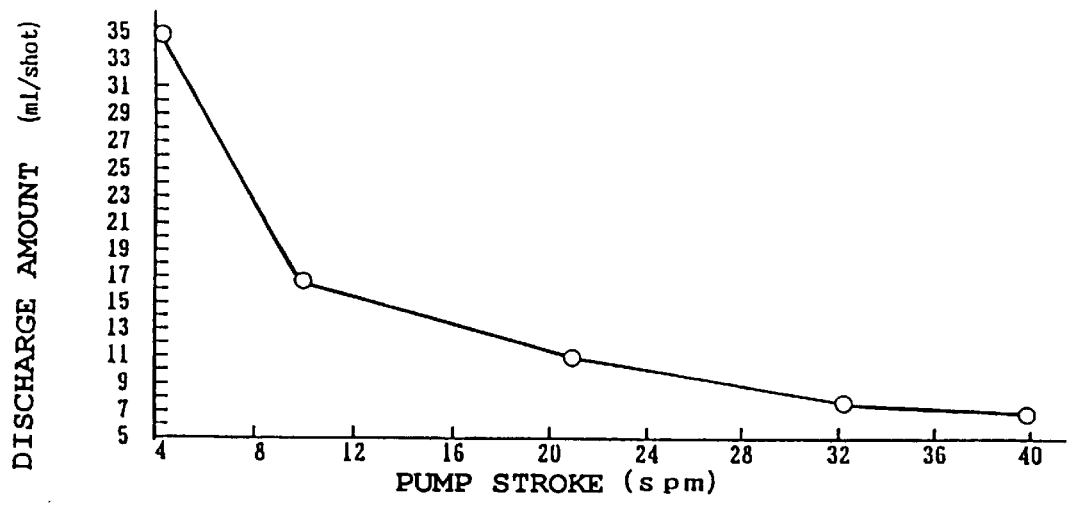
FIG. 8 is a graph showing the results of a test of reproducibility of a bellows type constant volume pump using a coil-like resin-made spring of the prior art.
Figure 9:
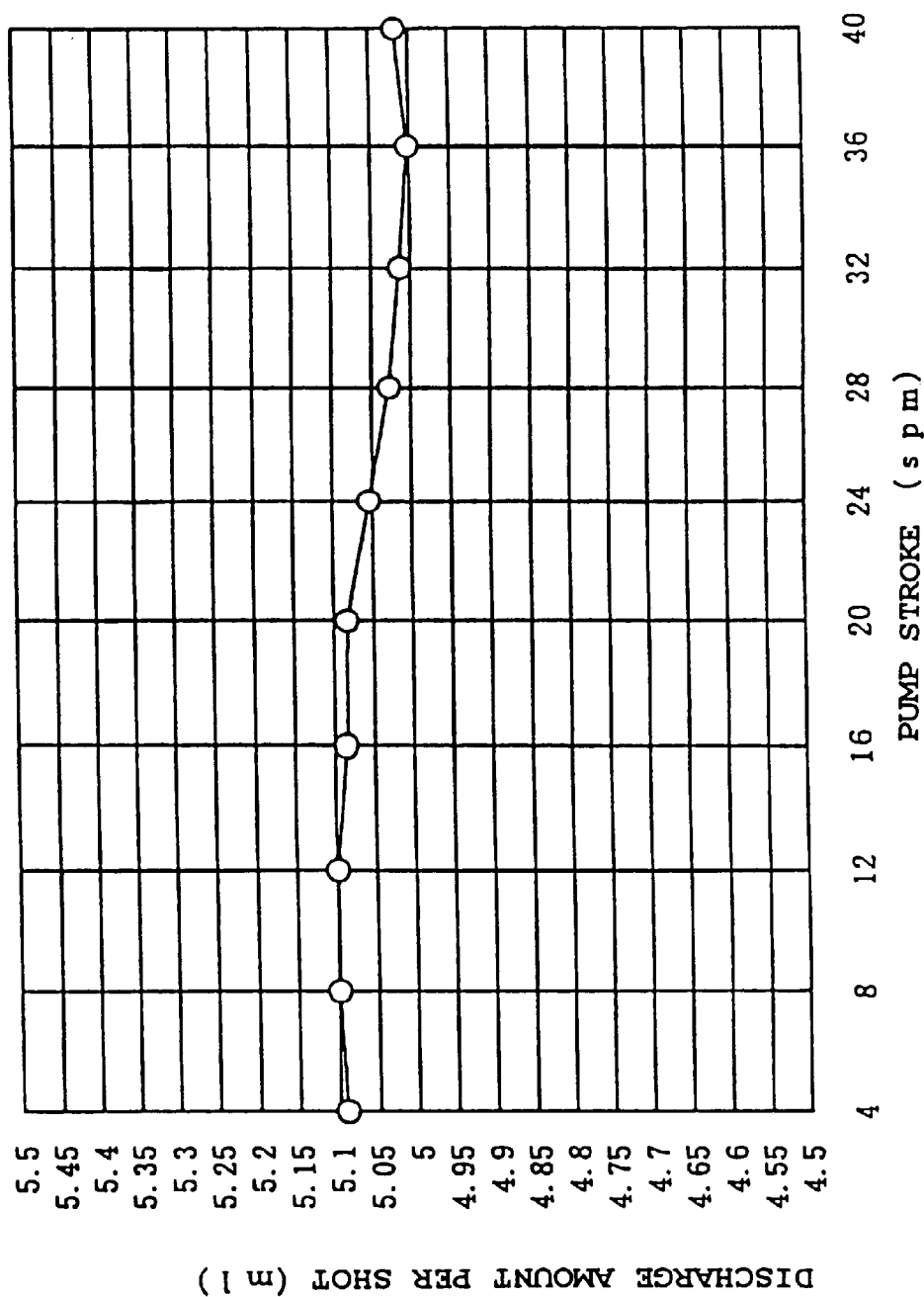
FIG. 9 is a graph showing the results of a test of reproducibility of a bellows type constant volume pump using a PTFE-made spring of the present invention.

FIG. 8 shows the results of the reproducibility. As apparent also from the test results, the discharge amount, which is originally 5 ml/shot, is increased. For example, the discharge amount is 30 ml or more at a stroke speed of 4 spm, and 15 ml or more at a stroke speed of 10 spm. In this way, as the stroke speed is lowered, the discharge amount is made larger by the siphon phenomenon which occurs during the discharge process, with the result that the constant volume property cannot be ensured. By contrast, the reproducibility test was conducted in the same test method and conditions as those described above on the bellows type constant volume pump of the present invention which is of 5 ml/shot and in which the PTFE-made spring 20 is used as the spring 12c that elastically urges in the closing direction the valve element 12b of the check valve 12 on the side of the tip end portion of the discharge hole 11. FIG. 9 shows the results of the test. As apparent from the test results, irrespective of a change of the stroke speed, the discharge amount is maintained to be substantially constant, or 5 ml/shot, with the result that the constant volume property can be ensured.

The contents and the results of a long-term reproducibility test which was conducted will be described. The test was conducted in the same test method and conditions as those described above on the bellows type constant volume pump of the present invention which is of 5 ml/shot and in which the PTFE-made spring 20 is used.

Items of the long-term test:

(1) Long-term continuous test at ordinary temperature: The pump is continuously operated at 40 spm in the test piping system shown in FIG. 6. The discharge amount is measured at two points, or at 4 spm and 40 spm.

(2) Long-term continuous test at a high temperature of 80° C.: The pump is continuously operated at 40 spm in the test piping system shown in FIG. 6. The discharge amount is measured at two points, or at 4 spm and 40 spm.

(3) Long-term continuous test of heat cycles (one heat cycle of 2 Hr. consisting of 1 Hr. at ordinary temperature and 1 Hr. at 80° C. is repeated): The pump is continuously operated at 40 spm in the test piping system shown in FIG.

6. The discharge amount is measured at two points, or at 4 spm and 40 spm.

Test results:

Results of the test (1) are shown in FIG. 10, those of test (2) are shown in FIG. 11, and those of test (3) are shown in FIG. 13. As apparent also from the test results, in the bellows type constant volume pump of the present invention which is of 5 ml/shot and in which the PTFE-made spring 20 is used, the discharge accuracy is stably held to 5 ml±2% in all the long-term continuous tests at ordinary temperature, at a high temperature of 80° C., and of heat cycles. As the stroke number is made larger, particularly, the stability is further increased.

By contrast, in the bellows type constant volume pump of the prior art which is of 5 ml/shot and in which a coil-like resin-made spring is used, the repulsion force is reduced to one third or less as a result of one cycle of the heat cycle of ordinary temperature to 80° C. Therefore, it will be easily understood that even test results which may be comparable to the results of the tests (1) to (3) cannot be obtained and the discharge amount of about 0.5 to 30 ml is obtained as a result of one cycle.

In the embodiment described above, PTFE is used as the resin constituting the resin-made spring 20. Alternatively, another fluororesin such as PFA may be used.

In the bellows type constant volume pump of the embodiment, the PTFE-made spring 20 is used in both the check valve 12 on the side of the tip end portion of the discharge hole 11, and the check valve 6 on the side of the basal end portion of the suction hole 3. Alternatively, the PTFE-made spring 20 may be used in only the check valve 12 on the side of the tip end portion of the discharge hole 11. Also the alternative can exhibit a constant volume property similar to that described above.

What is claimed is:

1. A resin-made spring comprising a longitudinally extending strip-like resin-made sheet bent in a zigzag manner in the longitudinal direction and providing thereby adjacent bent portions defining side faces and with a predetermined swelling curvature, said side faces of adjacent bent portions being one of: in close proximity to, and in contact with each other.

2. A resin-made spring according to claim 1, wherein said bent portions are elastically expandable and contractible by means of heat holding and cooling.

3. A resin-made spring according to claim 1, wherein a resin constituting said strip-like resin-made sheet is a fluororesin.

4. A resin-made spring according to claim 2, wherein a resin constituting said strip-like resin-made sheet is a fluororesin.

5. A resin-made spring according to claim 3, wherein the fluororesin is PTFE.

6. A resin-made spring according to claim 4, wherein the fluororesin is PTFE.

7. A resin-made spring according to claim 3, wherein the fluororesin is PFA.

8. A resin-made spring according to claim 4, wherein the fluororesin is PFA.

9. A resin-made spring according to claim 1, wherein said strip-like resin-made sheet has a thickness of 0.05 to 1.0 mm and each of said bent portions has a radius of curvature of 0.05 mm or more.

10. A resin-made spring according to claim 2, wherein said strip-like resin-made sheet has a thickness of 0.05 to 1.0 mm and each of said bent portions has a radius of curvature of 0.05 mm or more.

11. A bellows type constant volume pump, comprising:

a pump body having a circular projection defining a tip end portion and an outer periphery, and in which a suction hole for a fluid to be transported, and a discharge hole for the fluid to be transported are formed, and a fluid path communicating with said suction hole is formed, said discharge hole opening in an end face of said tip end portion;

a bellows disposed on said outer periphery of said circular projection, one end of said bellows being fixed to said pump body, the other end defining a closed portion being movable between a compression end position where it abuts against said end face of said tip end portion, and an expansion end position where it is separated from said end face of said tip end portion;

a reciprocation driving device which is connected to said bellows and which causes said bellows to expand and contract;

a check valve disposed at a basal end portion of said suction hole and allows only a flow of the fluid to be discharged, in a suction direction; and another check valve disposed at said tip end portion of said discharge hole, and allows only a flow of the fluid to be discharged, in a discharge direction, said pump using a resin-made spring as a spring for elastically urging, in a closing direction, a valve element from among said two check valves, and at least said check valve on the side of said discharge hole, said resin-made spring having a configuration in which a longitudinally extending strip-like resin-made sheet is bent in a zigzag manner in the longitudinal direction providing thereby adjacent bent portions defining side faces and with a predetermined swelling curvature, said side faces of adjacent bent portions being one of: in close proximity to and in contact with each other.

12. A bellows type constant volume pump according to claim 11, wherein said bent portions are configured so as to be elastically expandable and contractible by means of heat holding and cooling.

13. A bellows type constant volume pump according to claim 12, wherein a resin constituting said strip-like resin-made sheet is PTFE.

14. A bellows type constant volume pump according to claim 13, wherein said strip-like resin-made sheet has a thickness of 0.05 to 1.0 mm and each of said bent portions has a radius of curvature of 0.05 mm or more.

* * * * *